C. HERMINGHUYSEN.
RESILIENT TIRE.
APPLICATION FILED JUNE 25, 1913.

1,087,013. Patented Feb. 10, 1914.

Witnesses
Frank Hough
James A. Kissell

Inventor
C. Herminghuysen
By Victor J. Evans
Attorney

UNITED STATES PATENT OFFICE.

CHRISTIAN HERMINGHUYSEN, OF VAN WERT, OHIO.

RESILIENT TIRE.

1,087,013.  Specification of Letters Patent.  Patented Feb. 10, 1914.

Application filed June 25, 1913. Serial No. 775,728.

*To all whom it may concern:*

Be it known that I, CHRISTIAN HERMINGHUYSEN, a citizen of the United States, residing at Van Wert, in the county of Van Wert and State of Ohio, have invented new and useful Improvements in Resilient Tires, of which the following is a specification.

This invention relates to improvements in resilient tires for vehicle wheels; and it has for its object the provision of a device of this character which may be constructed from a continuous spring arranged with many convolutions extending peripherally about the rim of the wheel and connected thereto so that the tire will possess a high degree of elasticity to permit the wheel to readily and effectually absorb the shocks and jars of the vehicle.

A further object of the invention is the provision of means for simplifying the method of connecting the tire with the rim and for positively holding the tire against creeping around the rim.

With these and other objects in view, the invention consists of certain novel features of construction, combination and arrangement of parts, as will be hereinafter described and claimed.

Figure 1:
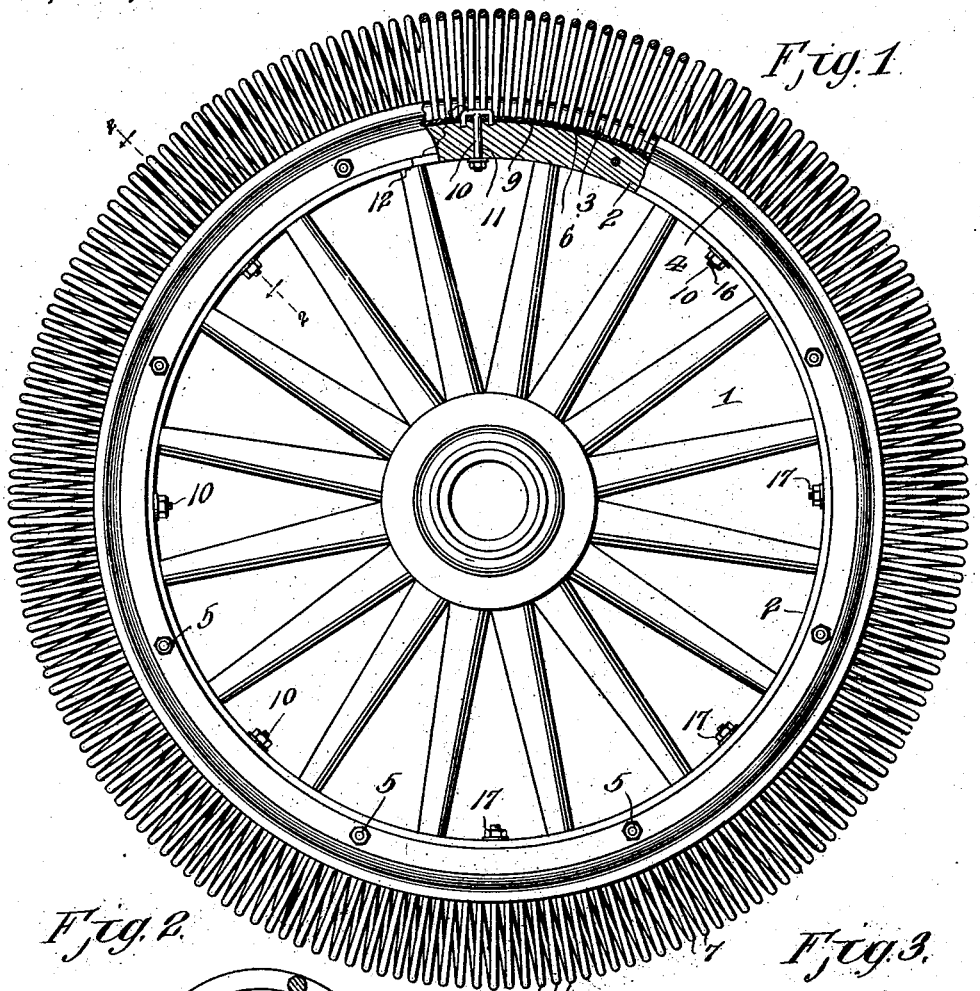
Figure 2:
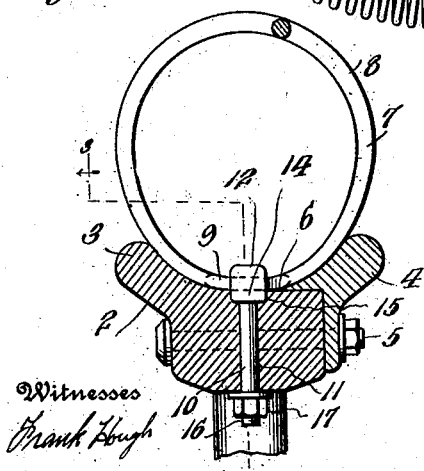
Figure 3:
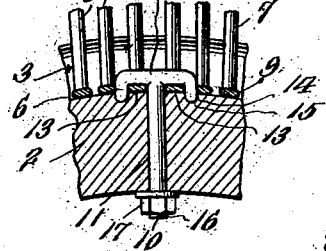

In the accompanying drawings: Figure 1 is a side view of the wheel; Fig. 2 is a section on line 2—2 of Fig. 1; Fig. 3 is a section on line 3—3 of Fig. 2.

The wheel 1 is provided with a rim 2 having an integral side flange 3 and a removable side flange 4, the latter having fastening bolts 5 extending therethrough and through the body of the rim, as shown in Fig. 2. The relative association of the two flanges 3 and 4 of the rim of the wheel defines a continuous intervening groove 6 between such flanges so as to accommodate the tire 7. The tire is constructed from a single length of spring steel having many convolutions 8 slightly spaced from each other and provided with relatively flat portions 9, which are seated directly against the walls of the groove 6 so as to prevent the convolutions from shifting laterally and to strengthen the convolutions and render the same capable of resisting comparatively heavy loads. The meeting convolutions at the terminals of the metal from which the tire is made may be welded or otherwise suitably secured together so that in effect the tire is one continuous structure. Fastening bolts 10 are adapted to be extended between adjacent convolutions of the tire and through radial passages 11 in the rim. These bolts are provided with heads 12 having recesses 13 therein to accommodate flat portions 9 of adjacent convolutions of the tire, as shown in Fig. 3. From the grooves 13 the heads are provided with extensions 14 that are adapted to be drawn into correspondingly formed recesses 15 in the rim 2 of the wheel. The bolts are threaded at 16 to receive clamping nuts 17, whereby the bolts may be moved radially and adjusted so as to bring the heads 12 thereof into operative clamping engagement with the tire, as will be understood.

In applying the tire to the rim the flange 4 of the latter is removed. The spring tire is then stretched over the rim and the bolts 10 are extended between the convolutions of the spring and then turned so that the heads 12 lie at right angles to the plane of the adjacent flat portions 9. The clamping nuts 17 are then adjusted so as to hold the tire in an applied position. After this operation the removable flange 4 of the rim is applied and the bolts 5 adjusted so as to bring the inner surface 18 of the removable flange into positive engagement with all of the convolutions of the tire whereby to brace the latter and assist in the action of the companion fixed flange 3 toward holding the tire against slipping laterally from the rim. The fact that the bolts are extended into the recesses 15 insures the bolts against being subjected to undue strain under tendency of the tire to creep around the rim. At the same time the construction is such that the bolts are effectually held against casually working from their intended positions.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

A vehicle wheel, a resilient tire extending entirely around the rim and constructed of a single piece of spring steel having many closely related convolutions, the convolutions having relatively broad flat surfaces seated directly against the rim, the rim having radial passages therein and recesses disposed adjacent said passages, fastening bolts extending between adjacent convolutions of the tire and through the radial passages in the rim, and heads traversing the flat portions of the convolutions and having extensions fitting in said recesses.

In testimony whereof I affix my signature in presence of two witnesses.

CHRISTIAN HERMINGHUYSEN.

Witnesses:
GRACE TANQUARY,
G. M. SALTZGABER.